US011371940B2

(12) United States Patent
Stark et al.

(10) Patent No.: US 11,371,940 B2
(45) Date of Patent: Jun. 28, 2022

(54) SYSTEM AND METHOD TO CONDUCT REAL-TIME CHEMICAL ANALYSIS OF DEPOSITS

(71) Applicant: Halliburton Energy Services, Inc., Houston, TX (US)

(72) Inventors: Daniel Joshua Stark, Houston, TX (US); John Laureto Maida, Jr., Houston, TX (US); Philippe Quero, Houston, TX (US); Christopher Michael Jones, Katy, TX (US); Bin Dai, Spring, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 165 days.

(21) Appl. No.: 16/954,448

(22) PCT Filed: Jan. 12, 2018

(86) PCT No.: PCT/US2018/013560
§ 371 (c)(1),
(2) Date: Jun. 16, 2020

(87) PCT Pub. No.: WO2019/139614
PCT Pub. Date: Jul. 18, 2019

(65) Prior Publication Data
US 2021/0088447 A1 Mar. 25, 2021

(51) Int. Cl.
G01N 21/65 (2006.01)
G01N 21/64 (2006.01)
E21B 47/002 (2012.01)

(52) U.S. Cl.
CPC ..... *G01N 21/6456* (2013.01); *E21B 47/0025* (2020.05); *G01N 21/65* (2013.01); *G01N 2201/0631* (2013.01)

(58) Field of Classification Search
CPC ............... G01N 21/6456; G01N 21/65; G01N 2201/0631; E21B 47/0025
See application file for complete search history.

(56) References Cited

U.S. PATENT DOCUMENTS 7,362,422 B2   4/2008  DiFoggio et al.
8,173,955 B2   5/2012  Kalb
(Continued)

FOREIGN PATENT DOCUMENTS

EP      2971482       2/2017
WO   2014018002       1/2014
(Continued)

OTHER PUBLICATIONS

C.W. Morris ; M.M. Felling ; R.J. Butsch ; W. Sass, "Using Optical Fluid Analysis to Evaluate Downhole Fluid Sample Contamination" (Oct. 20, 1998).

(Continued)

*Primary Examiner* — David P Porta
*Assistant Examiner* — Fani Polyzos Boosalis
(74) *Attorney, Agent, or Firm* — Thomas Rooney; C. Tumey Law Group PLLC

(57) ABSTRACT

A system for conducting real-time chemical analysis of deposits is provided. The system includes an electromagnetic radiation source positioned on a downhole tool that emits electromagnetic radiation to a surrounding downhole environment within a field of view of interest. The system also includes a multivariate optical element positioned on the downhole tool that has optical filters configured to receive reflected radiation from the field of view of interest and generate respective filtered radiation signals. Each of the optical filters has a different transmission function that corresponds to a respective chemical species of interest. The system also includes an image sensor positioned on the (Continued)

downhole tool that detects each of the respective filtered radiation signals from the multivariate optical element. The image sensor provides image information of the field of view of interest that indicates a presence of at least one chemical species of interest located in the surrounding downhole environment.

20 Claims, 11 Drawing Sheets

(56) References Cited

U.S. PATENT DOCUMENTS

| | | | |
|---|---|---|---|
| 9,429,013 | B2 | 8/2016 | Wang et al. |
| 9,528,931 | B2 | 12/2016 | Freese et al. |
| 2012/0169841 | A1 | 7/2012 | Chemali et al. |
| 2013/0287061 | A1 | 10/2013 | Freese et al. |
| 2014/0182935 | A1 | 7/2014 | Weaver et al. |
| 2014/0352397 | A1 | 12/2014 | Smits |
| 2016/0076367 | A1 | 3/2016 | Freese et al. |
| 2016/0195412 | A1 | 7/2016 | Barfoot et al. |
| 2020/0088894 | A1 | 3/2020 | LeBlanc et al. |

FOREIGN PATENT DOCUMENTS

| | | |
|---|---|---|
| WO | 2017019072 | 2/2017 |
| WO | 2017039675 | 3/2017 |

OTHER PUBLICATIONS

ISRWO International Search Report and Written Opinion for PCT/US2018/013560 dated Oct. 11, 2018.

Smits, et al., In-Situ Optical Fluid Analysis as an Aid to Wireline Formation Sampling, SPE 93-26496 Formation Evaluation, Jun. 1995.

C. Dong, et al., New Downhole Fluid Analyzer Tool for Improved Reservoir Characterization, SPE 07-108566, Mar. 16, 2016.

Julian Y. Zuo, et al., A Breakthrough in Accurate Downhole Fluid Sample Contamination Prediction in Real Time, 2015.

Priore, R. J., Haibach, F. G., Schiza, M. V., Greer, A. E., Perkins, D. L., & Myrick, M. L. (2004). Miniature Stereo Spectral Imaging System for Multivariate Optical Computing. Applied Spectroscopy, 58(7), 870-873.

Imaging ICE System

SYSTEM AND METHOD TO CONDUCT REAL-TIME CHEMICAL ANALYSIS OF DEPOSITS

BACKGROUND

In the field of oil and gas exploration and production, characterization of reservoir or wellbore fluid composition samples is desirable to determine the quality of a product or the condition of a container, a wellbore, or a pipeline, or to adjust and modify a drilling or production parameter. Deposits often hinder production, and production tubing is often called upon to chemically remove the deposit, particularly in off-shore jobs. However, the chemical forming the deposit is rarely known. Common practice is to cycle through a known series of solutions that are known to dissolve the most common materials making up a deposit and/or to run slickline or wireline jobs to obtain a sample for analysis, which then guides which solution series to use. These methods, however, lead to significant non-productive time. Often the deposit still cannot be determined leading to large quantities of chemicals and significant time used on formulations that do not dissolve the deposit since the chemicals were designed to dissolve different materials.

Figure 1:
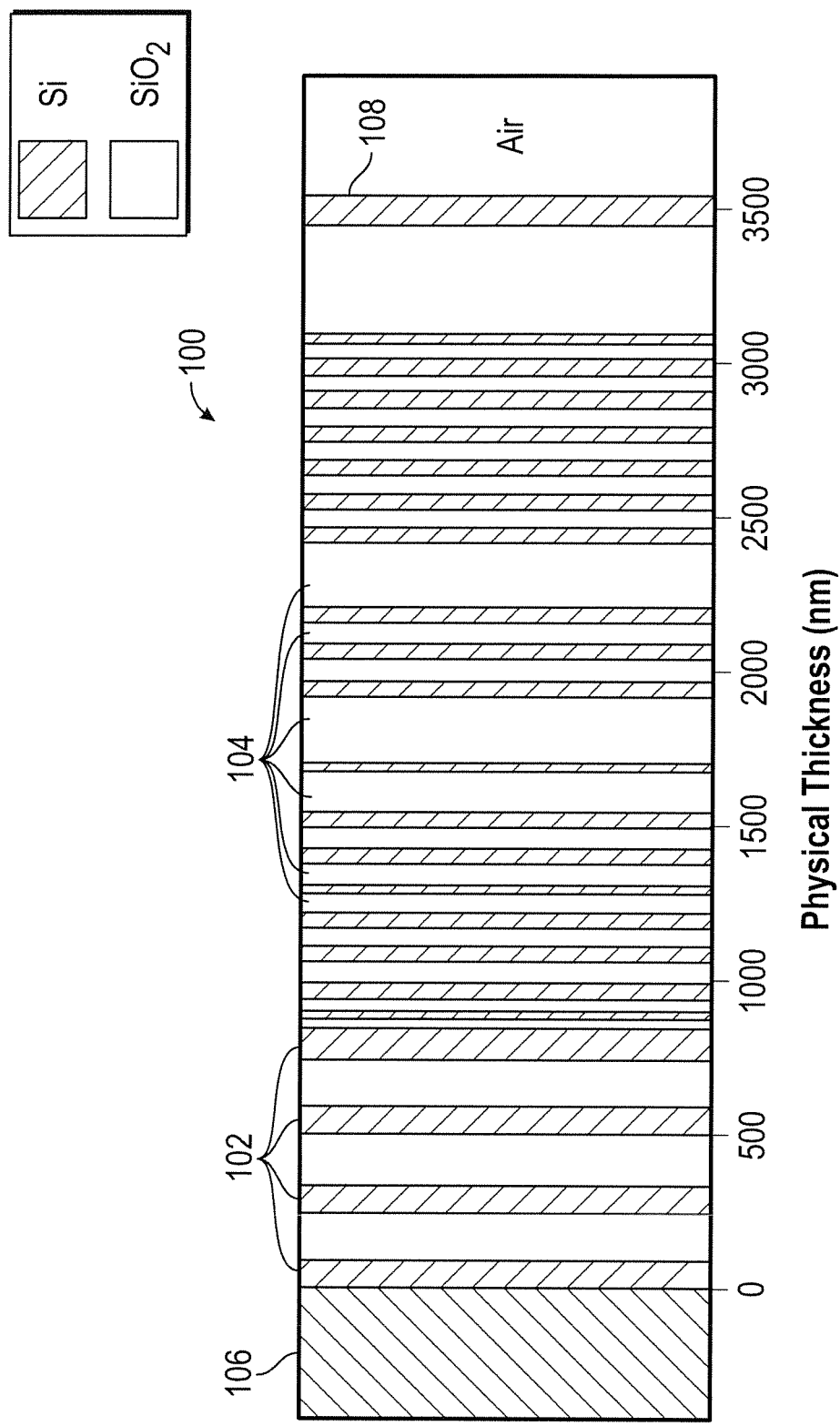
FIG. 1 illustrates a cross-sectional view of an exemplary Integrated Computational Element (ICE) in accordance with one or more implementations.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

The present disclosure provides for the creation of a device that combines an ICE and a downhole camera, to apply the device to an intelligent coiled tubing system or other downhole tool, to conduct real-time, wide-field chemical analysis before and during a downhole operation (e.g., pumping of chemical solutions meant to dissolve deposits without hindering flow). Specifically, the subject technology allows field personnel to potentially distinguish between a) Iron Sulfide (FeS), Calcium Carbonate ($CaCO_3$), Barium Sulfate ($BaSO_4$), b) saturates, asphaltenes, c) hydrates, d) grease, e) rust, corrosion, and f) proppant, formation sand.

The subject technology has the ability to distinguish between rubber and fish metal to assist in fishing jobs. Additionally, when the subject system is combined with other energy sources such as x-rays or gamma rays, it can be used to distinguish between such materials as natural sand and formation sand. The subject technology also does not require extraction of a sample, so it is particularly useful for tight formations, and can be particularly useful for distinguish buildup (sand, scale, or organics) at the heel where other methods traditionally have difficulty. Furthermore, the subject technology can utilize the camera component of the system to extract the size, form factor, and packing of the materials being inspected. Finally, in certain implementation, the ICE component is removable, thereby allowing any deployed camera downhole to become a chemical sensing camera.

The present disclosure provides for use of an imaging sensor such as a camera, which leads to full form factor information being measured. The subject technology does not inhibit flow or increase non-production time (NPT). The subject technology does not require a sample to be extracted from the wellbore, so the subject technology can be used in tight formations. The subject technology does not clog due to sampling, and quickly responds if the surrounding environment changes. The subject technology can identify multiple chemical types in real-time. Through proper selection of sources, filters, and detectors, the subject technology can image (or render) a representation of chemicals sensitive to energy ranging in form from ultra-violet (UV) to gamma rays. Further, the subject technology can be designed to easily change filters to allow use of the camera in multiple situations. The subject technology can be used for either forward-facing operations, such as for fishing or past heels, or side-facing operations such as leak detection. The subject technology can be used in vertical wellbores as well as lateral (or horizontal) wellbores. The subject system can image an entire section of a casing or a wellbore simultaneously. The subject system can be used to construct a three-dimensional (3D) model of the deposits structure within a casing string.

In traditional pipe deposit inspection systems, a significant amount of time is spent trying to determine what a clogging deposit is made of, and at minimum 4-6 hours are required for a sample to be recovered from downhole. The subject technology allows for real-time chemical identification without requiring the extraction of a sample. The subject technology greatly reduces the amount of chemical required to remove a clogging deposit as only the most effective dissolving agent would be required. Currently, a cycle of dissolving agents are tried in succession with the hope that one of the dissolving agents will react with the clogging deposit. The subject technology eliminates NPT due to tripping in a wireline or slickline tool to identify a clog. The subject technology allows a field operator to distinguish material types during fishing or milling operations to ensure other tools are not damaged.

An ICE as disclosed herein is a processing element that optically interacts with a substance to determine quantitative and/or qualitative values of one or more physical or chemical properties of a substance to be analyzed. The ICE may comprise a multilayered interference element designed to operate over a continuum of wavelengths in the electromagnetic spectrum from the ultraviolet (UV, about 290 nm to about 400 nm), through the visible (VIS, about 400 nm to about 750 nm), through the near-infrared (NIR, about 750 nm to about 2500 nm), and to mid-infrared ranges (MIR, about 2500 nm to about 1O,OOO nm), or any sub-set of that region. Electromagnetic radiation that optically interacts with the ICE is modified to be readable by a detector such that an output of the detector can be correlated to the physical or chemical property or "characteristic" of the substance being analyzed.

As used herein, the term "characteristic" refers to a chemical, mechanical, or physical property of a substance. The characteristic of the substance may include a quantitative or qualitative value of one or more chemical constituents or compounds present therein, or any physical property associated therewith. Such chemical constituents and compounds may be alternately referred to as "analytes." Illustrative characteristics of a substance that can be monitored with the optical computing devices described herein can include chemical composition (e.g., identity and concentration in total or of individual components), phase presence (e.g., gas, oil, water, etc.), impurity content, ion content, pH, alkalinity, viscosity, density, ionic strength, total dissolved solids, salt content (e.g., salinity), porosity, opacity, bacteria content, total hardness, combinations thereof, state of matter (solid, liquid, gas, emulsion, mixtures, etc.), and the like.

As used herein, the term "optical computing device" refers to an optical device that is configured to receive an input of electromagnetic radiation, to interact the electromagnetic radiation with a substance and to produce an output of electromagnetic radiation from a processing element arranged within the optical computing device. In some embodiments, an optical computing device also includes a detector to generate an electronic signal indicative of a characteristic of the substance. The processing element may be, for example, an ICE, or a multivariate optical element (MOE). The electromagnetic radiation that optically interacts with the processing element is modified so as to be readable by a detector, such that an output of the detector can be correlated to a particular characteristic of the substance. The output of electromagnetic radiation from the processing element can be reflected, transmitted, and/or dispersed electromagnetic radiation. Whether the detector analyzes reflected, transmitted, or dispersed electromagnetic radiation may be dictated by the structural parameters of the optical computing device as well as other considerations known to those skilled in the art. In addition, emission and/or scattering of the fluid, for example via fluorescence, luminescence, phosphorescence, scintillation, incandescence, Raman, Mie, and/or Raleigh scattering, can also be monitored by optical computing devices.

As used herein, the term "optically interact" or variations thereof refers to the reflection, transmission, scattering, diffraction, or absorption of electromagnetic radiation either on, through or from one or more processing elements (i.e., ICE or MOE components) or a substance being analyzed by the processing elements. Accordingly, optically interacted light refers to electromagnetic radiation that has been reflected, transmitted, scattered, diffracted, or absorbed, emitted, or re-radiated, for example, using a processing element, but may also apply to interaction with a substance.

As used herein, the term "electromagnetic radiation" refers to radio waves, microwave radiation, any radiation in the UV, VIS, NIR or MIR regions, X-ray radiation and gamma ray radiation.

FIG. 1 illustrates a cross-sectional view of an exemplary ICE 100 in accordance with one or more implementations. As illustrated, ICE 100 may include a plurality of alternating layers 102 and 104, such as silicon (Si) and $SiO_2$ (quartz), respectively. In general, layers 102, and 104 include materials whose index of refraction is high and low, respectively. Other examples of materials for use in layers 102 and 104 might include niobia and niobium, germanium and germania, MgF, SiO, and other high and low index materials known in the art. The layers 102, 104 may be strategically deposited on an optical substrate 106. In some embodiments, the optical substrate 106 is BK-7 optical glass. In other embodiments, optical substrate 106 may be another type of optical substrate, such as quartz, sapphire, silicon, germanium, zinc selenide, zinc sulfide, or various plastics such as polycarbonate, polymethylmethacrylate (PMMA), polyimide, polyvinylchloride (PVC), diamond, ceramics, combinations thereof, and the like.

At the opposite end (e.g., opposite optical substrate 106 in FIG. 1), the ICE 100 may include a layer 108 that is generally exposed to the environment of the device or installation, and may be able to detect a sample substance. The number of layers 102, 104 and the thickness of each layer 102, 104 are determined from the spectral attributes acquired from a spectroscopic analysis of a characteristic of the substance being analyzed using a conventional spectroscopic instrument. The spectrum of interest of a given characteristic typically includes any number of different wavelengths. It should be understood that the ICE 100 in FIG. 1 does not in fact represent any particular characteristic of a given substance, but is provided for purposes of illustration only. Consequently, the number of layers 102, 104 and their relative thicknesses, as shown in FIG. 1, bear no correlation to any particular characteristic of a sample. Nor are layers 102, 104 and their relative thicknesses necessarily drawn to scale, and therefore should not be considered limiting of the present disclosure. Moreover, those skilled in the art will readily recognize that the materials that make up each layer 102, 104 (i.e., Si and $SiO_2$) may vary, depending on the application, cost of materials, and/or applicability of the material to the given substance being analyzed.

In some implementations, the material of each layer 102, 104 can be doped or two or more materials can be combined to achieve the desired optical characteristic. In addition to solids, the ICE 100 may also contain liquids and/or gases, optionally in combination with solids, in order to produce a desired optical characteristic. In the case of gases and liquids, the ICE 100 can contain a corresponding vessel (not shown), which houses the gases or liquids. Exemplary variations of the ICE 100 may also include holographic optical elements, gratings, piezoelectric, light pipe, and/or acousto-optic elements, for example, that can create transmission, reflection, and/or absorptive properties of interest.

The layers 102 and 104 exhibit different refractive indices. By properly selecting the materials of layers 102, 104 and their relative thickness and spacing, the ICE 100 may be configured to selectively pass/reflect/refract predetermined fractions of electromagnetic radiation at different wavelengths. Each wavelength is given a predetermined weighting or loading factor. The thickness and spacing of layers 102, 104 may be determined using a variety of approximation methods from the spectrum of the characteristic or analyte of interest. These methods may include inverse Fourier transform (1FT) of the optical transmission spectrum and structuring the ICE 100 as the physical representation of the 1FT. The approximations convert the 1FT into a structure based on known materials with constant refractive indices.

The weightings that layers 102, 104 of the ICE 100 apply at each wavelength are set to the regression weightings described with respect to a known equation, or data, or spectral signature. When electromagnetic radiation interacts with a substance, unique physical and chemical information about the substance may be encoded in the electromagnetic radiation that is reflected from, transmitted through, or radiated from the substance. This information is often referred to as the spectral "fingerprint" of the substance. The ICE 100 performs the dot product of the electromagnetic radiation received by the sample interacted light and the wavelength dependent transmission function of the ICE 100. The wavelength dependent transmission function of the ICE 100 is dependent on the refractive index of the layer material, the number of layers 102, 104 and the layer thicknesses.

In some implementations, the transmission function of the ICE 100 is designed to mimic a desired regression vector derived from the solution to a linear multivariate problem targeting a specific component of the sample being analyzed. As a result, the output light intensity of the ICE 100 is proportional a dot product of a transmission spectrum of the sample with the regression vector associated with the characteristic of interest. Accordingly, the output light intensity of the ICE 100 is a direct indicator of a value of the characteristic of interest of the sample.

In some implementations, the thickness and number of each layer 102 and 104 in the ICE 100 are selected such that the resulting transmission spectrum of the ICE 100 is similar to one of a plurality of basis functions in a principal component analysis (PCA) decomposition of the desired characteristic of a sample.

Designing the ICE 100 may include a comparison of the transmission spectrum of the ICE 100 with an optical pressure-volume and temperature (PVT) database. The PVT-database includes spectra (i.e., transmittance spectra, absorbance spectra, reflectance spectra, fluorescence spectra, Raman spectra, and the like) of multiple samples with known values of the desired characteristic of the sample under known density, pressure and temperature conditions. The predictive performance of the ICE 100 may be evaluated in terms of accuracy and sensitivity for measuring the desired characteristic of the sample. A merit-based function such as a standard error of calibration (SEC), a root mean SEC (RMSEC), a sensitivity, an accuracy, or any combination of the above is used to determine the quality of a given ICE 100 design. For example, a SEC-based merit-function having a low value close to a global minimum may be desirable. In some implementations, a sensitivity-based merit function having a high value close to a global maximum may be desirable.

While some implementations of an optical system may use a single ICE to determine the selected characteristic of the sample, some implementations may benefit from additional ICEs. In some implementations, the optical system may include a plurality of ICEs, each ICE being associated with a spectral response of a basis function in a principal component analysis (PCA) decomposition of a desired characteristic of the sample. For example, the optical system may include some ICEs having a selected transmission in a first spectral domain and some ICEs having a selected transmission in a second spectral domain. Alternatively, the optical system may include a different number of ICEs, narrow band filters designed for different spectral regions, and the like.

Figure 2A:
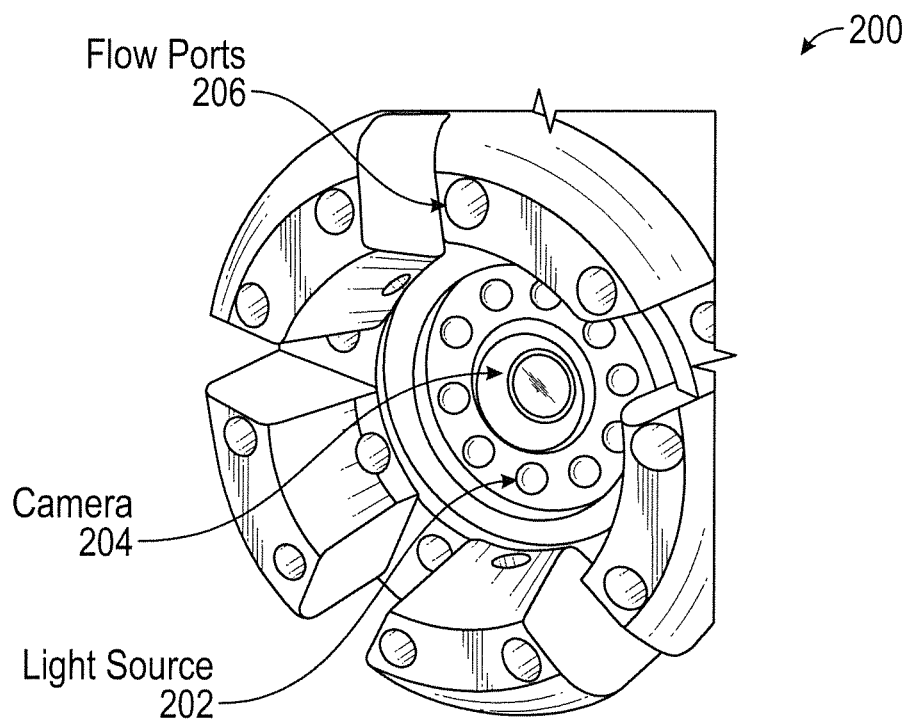
FIGS. 2A and 2B illustrate an example of an imaging system and an ICE core used in the imaging system in accordance with one or more implementations.
Figure 2B:
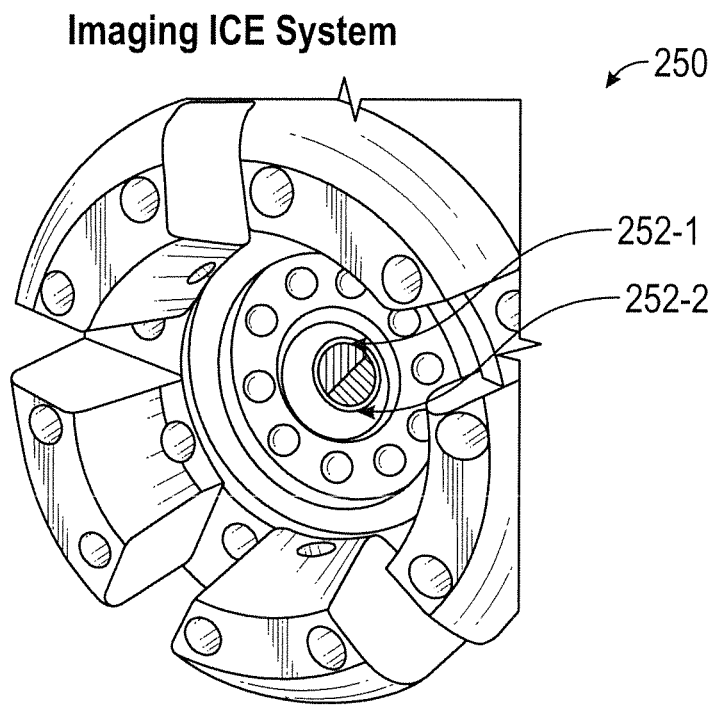

FIGS. 2A and 2B illustrate an example of an imaging system 200 and an ICE core 252 used in an imaging ICE system 250 in accordance with one or more implementations. FIG. 2A depicts a distal tubing head that forms part of a tubing string for downhole pumping operations. FIG. 2A also depicts an imaging sensor such as a camera 204 arranged within a center shaft area of the distal tubing head, and positioned to be pointing face-forward from the distal tubing head. The imaging system 200 is depicted without an ICE core arranged relative to the camera 204. The imaging system 200 also includes a light source 202 also positioned in the distal tubing head, and disposed around the camera 204 for illuminating in a direction of a field of view of the camera 204. The distal tubing head also includes flow ports 206 for facilitating the pumping operations of fluid.

The present disclosure provides for the combining of existing multivariate optical computing methods utilized in commercial ICE systems with a downhole camera (e.g., 204) and light source (e.g., 202). FIG. 2B depicts the imaging ICE system 250 that combines the ICE core 252 with the camera 204 to create ICE-based imaging of material buildup in front of the tubing string. As illustrated in FIG. 2B, the ICE core 252 consists of two optical filters (e.g., 252-1, 252-2), each side with its own tailored transmission pattern. However, the ICE core 252 may include an arbitrary number of optical filters depending on implementation without departing from the scope of the present disclosure. Each of the ICE cores 252-1, 252-2 respectively consists of an optical filter whose transmission pattern is specifically tailored to a chemical species of interest.

Figure 3:
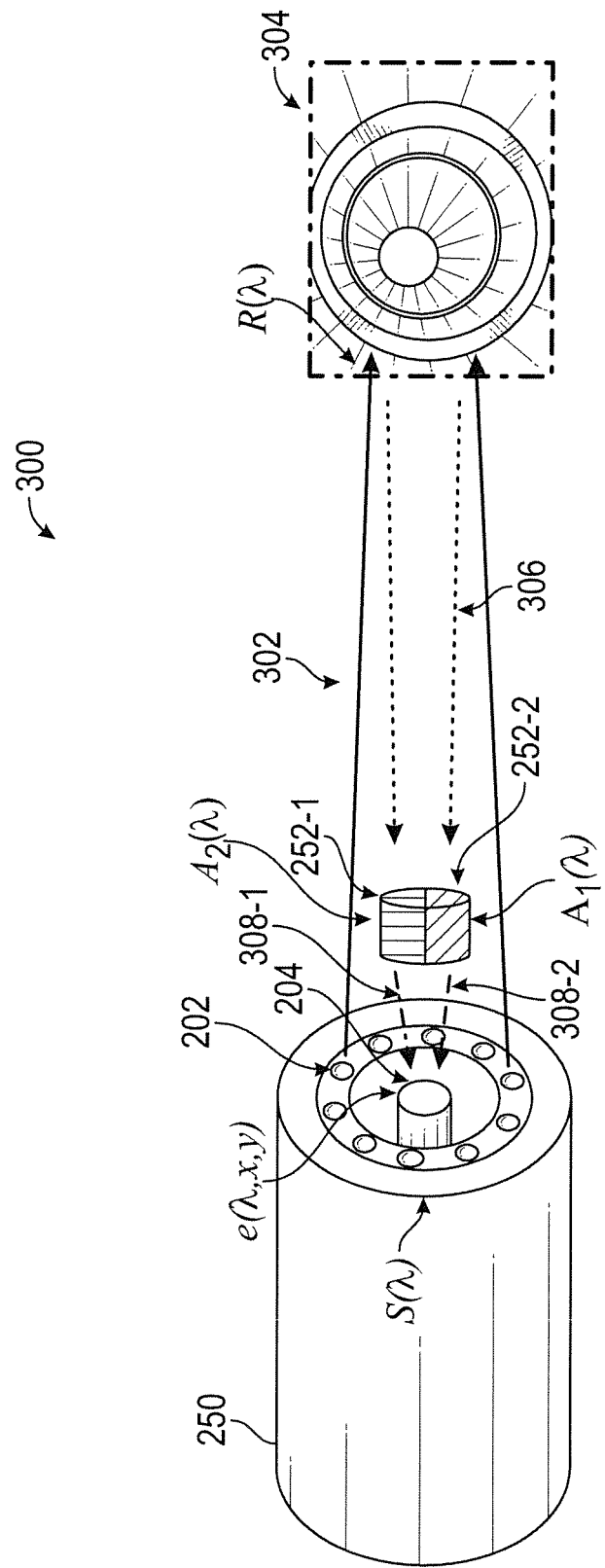
FIG. 3 illustrates an optical system for conducting real-time chemical analysis of deposits with a multivariate optical element in accordance with one or more implementations.

FIG. 3 illustrates an optical system 300 for conducting real-time chemical analysis of deposits with a multivariate optical element, such as the ICE 100, which includes an optical filter or multiple optical filters (e.g., 252-1, 252-2). An electromagnetic radiation source such as an optical source 202 generates electromagnetic radiation such as an illumination light 302 to interact with a surrounding downhole environment 304 within a field of view of interest (from the camera 204), which in turn generates reflected radiation such as a sample light 306. The optical source 202 may be a broadband lamp, a laser, a light-emitting diode, a supercontinuum laser, a frequency comb, or any other source of electromagnetic radiation. In some implementations, the sample light 306 may include fluorescence emitted photons or Raman shifted photons from the surrounding downhole environment 304.

Each of the optical filters 252-1, 252-2 interacts with a portion of the sample light 306 to form reflected radiation signals 308-1, 308-2, respectively. Each of the optical filters 252-1, 252-2 may be similar to or the same as ICE 100 of FIG. 1 and, therefore, may be used in the optical system 300. A property of the reflected radiation signals 308-1, 308-2 is indicative of a desired characteristic of a chemical species of interest located in the surrounding downhole environment 304. In some implementations, the property of the reflected radiation signals 308-1, 308-2 that is indicative of the characteristic of the chemical species of interest may be an intensity, a polarization state, a phase, a wavelength, or any combination of the above.

The optical system 300 also includes a detector (e.g., 204) that receives the filtered radiation signals 308-1, 308-2, respectively. The detector may be an imaging sensor such as a camera. The detector 204 can provide sensing signals to a controller (not shown) that is communicatively coupled to the optical system 300. In one or more implementations, the sensing signals may be electrical signals (e.g., a current or a voltage) associated with a spectral density distribution of the sample light 306 in a linear or a nonlinear manner.

The illumination light 302 emitted by the optical source 202 has a power density spectrum, $S(\Lambda)$. The sample light 306 reflected from the chemical (or substance) under investigation yields a reflection spectrum, $R(\Lambda)$. The reflection spectrum is then attenuated at each wavelength, $A(\Lambda)$, by the filter on the ICE core 252. In some aspects, the reflection spectrum may be attenuated by any material located between the reflection spectrum and the ICE core 252, such as water. The detector 204 has a detector efficiency, $e(\Lambda,x,y)$, at a given pixel of a coordinate map associated with the detector 204.

In addition to the visible to near IR light source (e.g., 202), an x-ray, gamma ray, or electric (DC or AC) source can be used in conjunction with the optical source 202 or instead of the optical source 202 to lead to fluorescence of the deposits under question. While the source light would not be visible to the detector 204, fluorescence, photoluminescence, phosphorescence, chemiluminescence, electroluminescence, radioluminescence, or other cold body luminescence would be emitted, providing an imageable light source indicating the presence of a relevant chemical. For example, a gamma ray source could be used to distinguish between natural and formation sands. In these instances, the S(2) and R(2) terms in Equation I collapse into a single term based upon the luminescence spectra $L(\Lambda)$, which depends not only on the energy distribution of the source but also the conversion mechanism of the material considered.

The detector 204 may also be selected to be sensitive to wavelengths in the visible UV, infrared, or terahertz spectra. Infrared cameras or terahertz imagers may be used to examine those spectral ranges with appropriately designed filters to examine spectral regimes. For example, calcium carbonate ($CaCO_3$) and iron sulfide (FeS) may be difficult to distinguish in the visible spectrum, but may have significantly different spectroscopic absorption peaks in the mid- or far-infrared spectrum. Comparisons in the terahertz region, for example, have been shown to distinguish between steel and rust.

Pure temperature variations may also be imaged by using filters with filter shapes corresponding to black body spectra for relevant temperatures. This may be used to identify the location of leaks through a casing, fluid flows through a perforation, or the existence of exothermic or endothermic reactions due to chemicals pumped downhole.

The controller may include a processor and a memory. The memory stores data and commands which, when executed by the processor, cause the controller to direct the system 300 to perform steps in a method consistent with the present disclosure (e.g., process 700 of FIG. 7). The processor may combine each of the sensing signals according to commands stored in the memory, to determine a selected characteristic of the chemical species of interest (or chemical deposit).

In some implementations, the system 300 includes an optical component that separates the sample light 306 into portions, where each portion of sample light may be directed onto one of the optical filters 252-1, 252-2, respectively. It should be understood that the optical component may include any type of optical splitting and routing device, such as a beamsplitter, a mirror, a dichroic filter, an optical circulator, an arrayed waveguide grating (AWG), and the like. In some aspects, the optical component is moveable by a predetermined amount of degrees (e.g., 30°) relative to an incidence angle of the optical component. In other aspects, the optical component can be a sampling window with a retractable feature, where the sampling window opens (or retracts an integrated cover) to allow the reflected radiation to transmit through the sampling window for a first predetermined duration of time. At the end of the first predetermined duration of time, the integrated cover may then be replaced to cover the sampling window for a second predetermined duration of time, thereby not allowing the reflected radiation to transmit through the sampling window.

Further, in some implementations, the system 300 includes other optical elements in the optical train, such as a fluid cell, a broadband filter, a narrowband filter, a holographic grating, a liquid crystal, or any other optical element.

While the imaging ICE cores (e.g., 252) have been shown to be separable from the camera system, they can also be placed directly on the imaging lens so that they cannot be removed (i.e., permanent installation). This can be done to improve mechanical reliability during high shock/vibe, high flow, or in the presence of high-momentum solid debris.

A retractable cover can also be incorporated into the optical system 300 to protect the optical elements (e.g., 202, 204, 252) and components from scratches, impacts, or mechanical torqueing from the environment. The retractable cover can also protect it for coiled tubing applications when pushing past a debris-filled heel. After chemically identifying the material clogging the heel and ascertaining the extent of packing of the various deposits, the operator may decide to simply push past the blockage into the lateral (or horizontal) wellbore. In this case, the cover would protect a forward-facing Imaging ICE system and allow it to be used within the lateral.

Figure 4A:
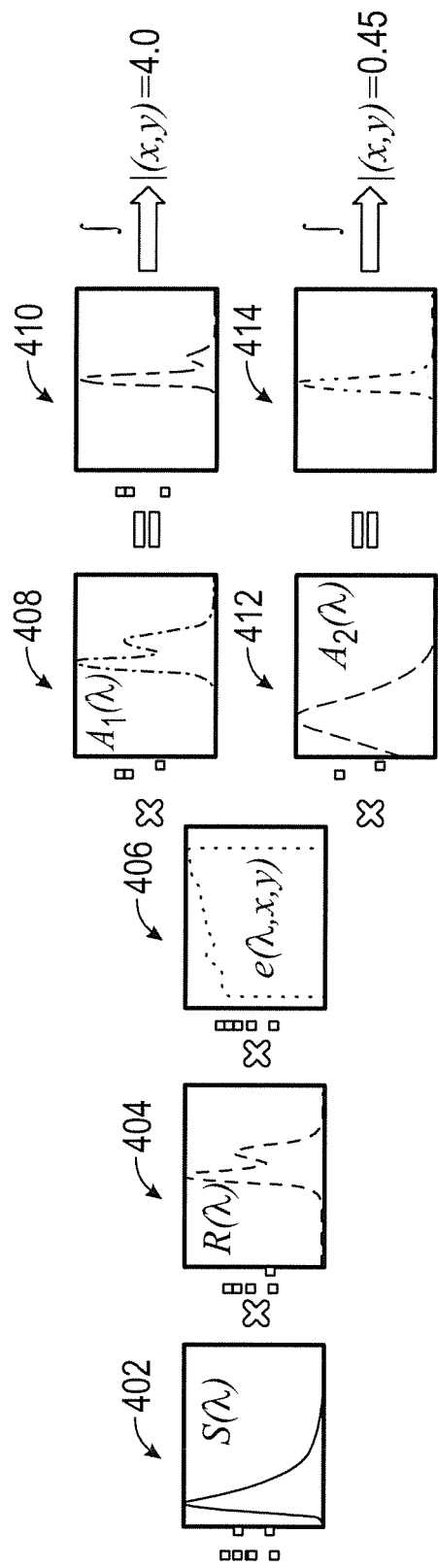
FIGS. 4A and 4B illustrate a sample imaging ICE methodology for an example optical system with short and long wavelength chemical reflecting light in accordance with one or more implementations.
Figure 4B:
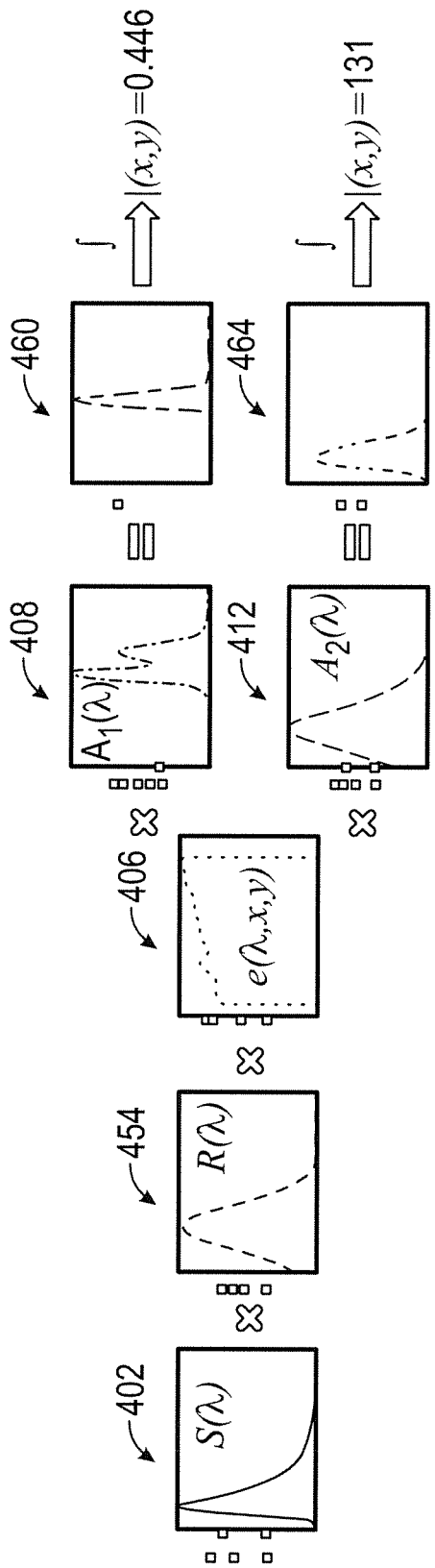

FIGS. 4A and 4B illustrate a sample imaging ICE methodology for an example optical system with short and long wavelength chemical reflecting light in accordance with one or more implementations. Both FIGS. 4A and 4B demonstrate the mechanism of multivariate optical computing in pipe deposit inspection. FIG. 4A depicts a sample imaging ICE methodology for an example optical system (e.g., 300) with a long wavelength chemical reflecting light. FIG. 4B depicts a sample imaging ICE methodology for an example optical system (e.g., 300) with a short wavelength chemical reflecting light.

More specifically, the optical source 202 illuminates a field of view of interest within the surrounding downhole environment 304, the reflected light transmits through the respective filter, and the filtered light is imaged by the detector 204. Namely, the power density spectrum (e.g., 402) emitted by the optical source 202, $S(\Lambda)$, is reflected from the chemical (or substance) under investigation yielding a reflection spectrum (e.g., 404, 454), $R(\Lambda)$, where the reflection spectrum is a multiplication of the intensity of the electromagnetic radiation from the optical source 202 at a specific wavelength and a reflection coefficient of the investigated chemical at that wavelength. The reflection spectrum is then attenuated at each wavelength (e.g., 408, 412), $A(\Lambda)$, by a respective optical filter (e.g., 252-1, 252-2) on the ICE core 252. The filtered, reflected radiation signal is then detected by the camera 204 at each pixel, I(x,y), with a resultant signal (e.g., 410, 414, 460, 464) that is a continuous dot product of the final power spectrum and the detector efficiency (e.g., 406), e(A,x,y), of that pixel. Or mathematically, expressed as follows:

$$l(x,y)=\int zS(;t,)R(.tt)A(/t)e(/t,x,y)d-1.$$   Equation (I)

where $A_1$ to $A_2$ are the spectral limits of the detector (e.g., 204).

Each of the charts depicted in FIGS. 4A and 4B span a minimum to a maximum spectral response intensity in a range of 0 to 1 in the ordinate axis (arbitrary units) and covers a wavelength range from about 0 to about 15, in the abscissae (arbitrary units). The ordinates of spectra charts 410, 414, 460 and 464, respectively indicate the spectral response intensity of the resultant signal. Accordingly, the ordinates in spectra charts 408, 412 are convolved with the transmission function of an optical train leading to the optical filters 252-1, 252-2, including sapphire windows in a sample cell (or fluid cell), band pass filters, the efficiency profile (e.g., 406) of the detector 204, the emission profile (e.g., 402) of the illumination light 302 and the reflection profile of the chemical species under investigation. Spectra 404 may have been produced using data collected using a high-resolution spectrometer with samples under known pressure and temperature (e.g., a Fourier Transform Infrared spectrometer).

Figure 5A:
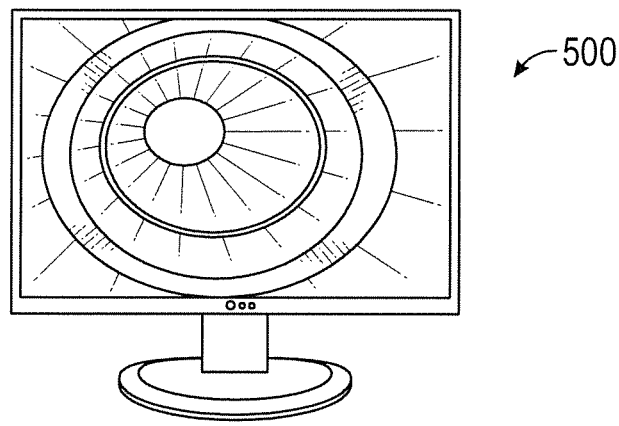
FIGS. 5A-5C illustrate examples of a display of a field of interest indicating a chemical species of interest located in a surrounding downhole environment in accordance with one or more implementations.
Figure 5B:
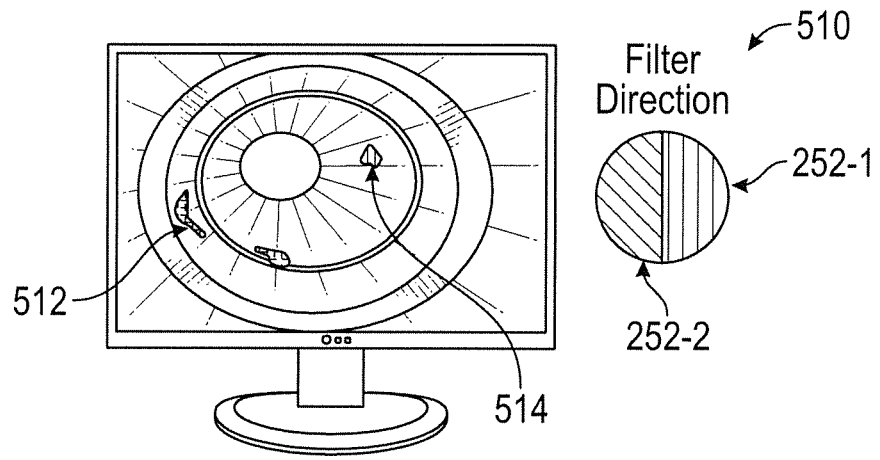
Figure 5C:
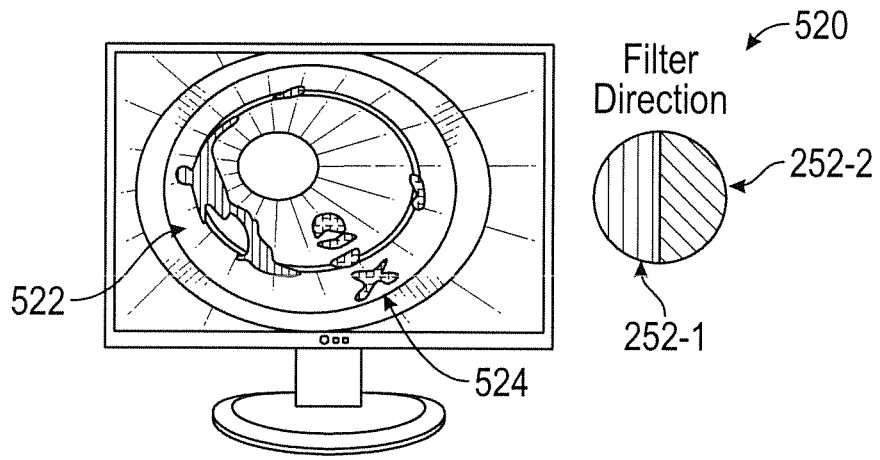

FIGS. 5A-5C illustrate examples of a display of a field of interest indicating a chemical species of interest located in a surrounding downhole environment when using an imaging ICE system in accordance with one or more implementations. In FIG. 5A, no optical filters (e.g., 252) are applied to an imaging system (e.g., 200), which in turn generates a raw resultant image 500 depicting the field of view of interest within the surrounding downhole environment without any indications of a chemical species of interest. In FIG. 5B, a resultant image 510 depicts a field of view of interest indicating a first chemical species of interest (e.g., 514) identified by a first optical filter 252-1 appear on the right with a second chemical species of interest (e.g., 512) identified by a second optical filter 252-2 appear on the left. In FIG. 5C, a resultant image 520 depicts the same chemicals that are identified by the first and second optical filters (e.g., 252-1, 252-2), respectively, but the camera (e.g., 204) has rotated (i.e., the filter direction has thereby changed), indicating the location of the chemicals in other locations (e.g., 522, 524).

The resultant images (e.g., 510, 520) highlight the chemicals of interest (e.g., 512, 514, 522, 524) based upon which optical filter (e.g., 252-1, 252-2) the camera (e.g., 204) is imaging through. Although illustrated here with two filters, an ICE core may have only one optical filter or more than two optical filters. Additionally, the optical filters can be selected based upon the chemicals of interest. For example, a single ICE core may be patterned to have multiple optical filters to distinguish between metal and rubber or proppant and scale or hydrates and wax. The same imaging system may also be used for different sets of ICE cores. If a run (e.g., downhole pumping operation) is made with an ICE core sensitive to hydrates/wax but neither is present, the ICE core can be removed from the camera (e.g., 204) and replaced with another ICE core, such as an ICE core sensitive to metal/rubber to examine for potential other blockages.

The resultant image (e.g., 510, 520) can be transmitted to a surface via fiber optic, electric, or wireless telemetry to visually show an operator the presence of the chemicals of interest. As an ICE core is rotated, either purposefully or via natural rotation of the tubing, slickline, or wire line, the resultant image can display the presence of the chemical of interest in the additional areas of interest. Furthermore, the location of the chemicals, as a function of depth and orientation, can be recorded and reconstructed as a 3D model to allow the operator a greater understanding of the size, topography, shape, packing, and distribution of the chemicals of interest along the casing string. Additionally, the imaging system can be operated in memory mode if some field operation necessitates reduced telemetry data rates.

Figure 6A:
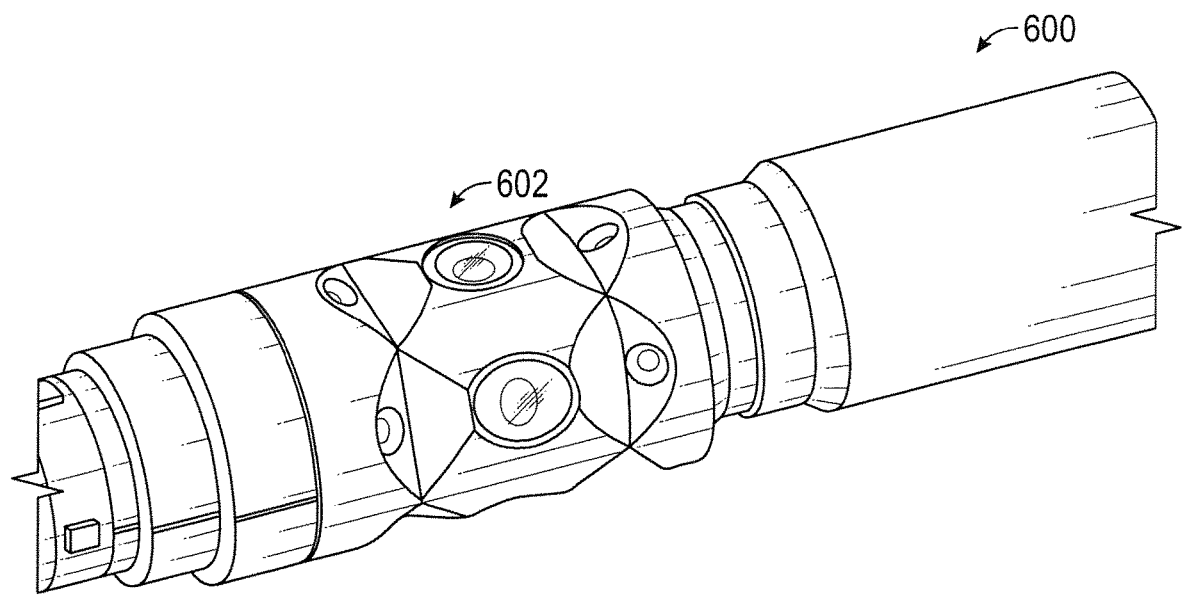
FIGS. 6A and 6B illustrate an example of an imaging ICE system positioned radially in accordance with one or more implementations.
Figure 6B:
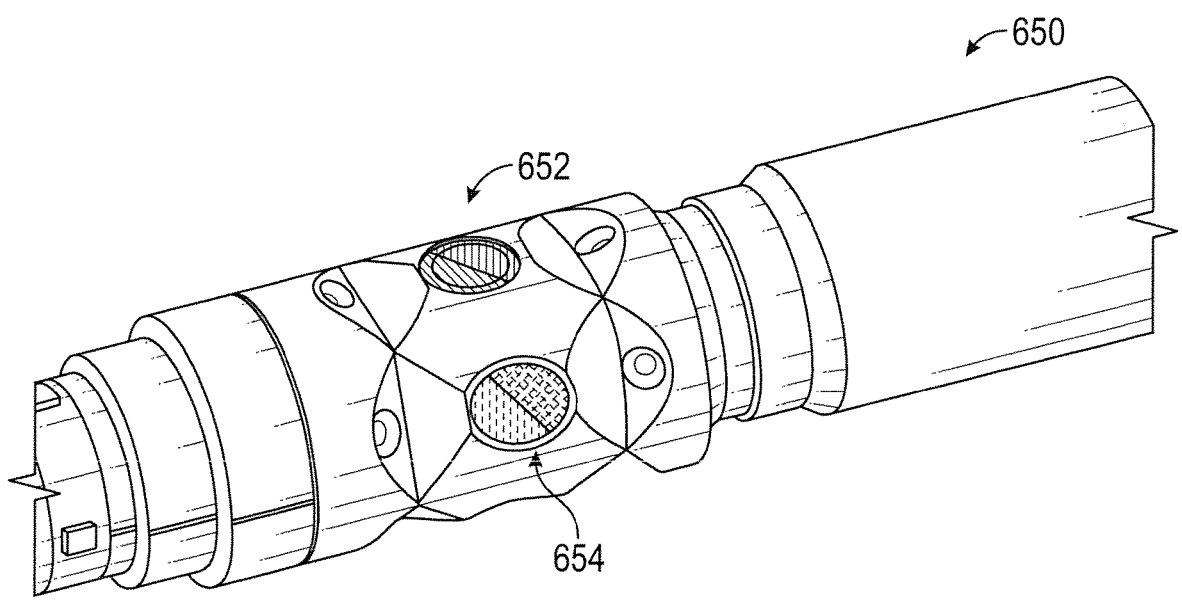

FIGS. 6A and 6B illustrate an example of an imaging ICE system positioned radially in accordance with one or more implementations. In some implementations, multiple cameras (e.g., 602) can be placed pointing radially along the tubing or wireline, instead of pointing forward, as shown in FIGS. 2A and 2B. FIG. 6A depicts an imaging system 600 with multiple cameras (e.g., 602) only. FIG. 6B depicts an imaging ICE system 650 with different optical filter sets (e.g., 652, 654) on each of the multiple cameras (e.g., 602). Each ICE core (e.g., 252) can be the same, or as shown, different optical filters (e.g., 652, 654) can be placed on each camera, allowing up to a predetermined number of chemical types (e.g., 24 types) to be examined simultaneously. Again, the optical filters (e.g., 652, 654) can be replaced or changed out as required, and a full, 360° composite video or dataset of all chemicals can be digitally created to show the operator so they can take appropriate action. Additionally, an asymmetric centralizer can be used to press the camera close to a casing or formation if fluids within the casing or wellbore interfere with imaging. Ideal imaging would be accomplished when a transparent fluid with a known spectral response is pumped through the system.

Figure 7:
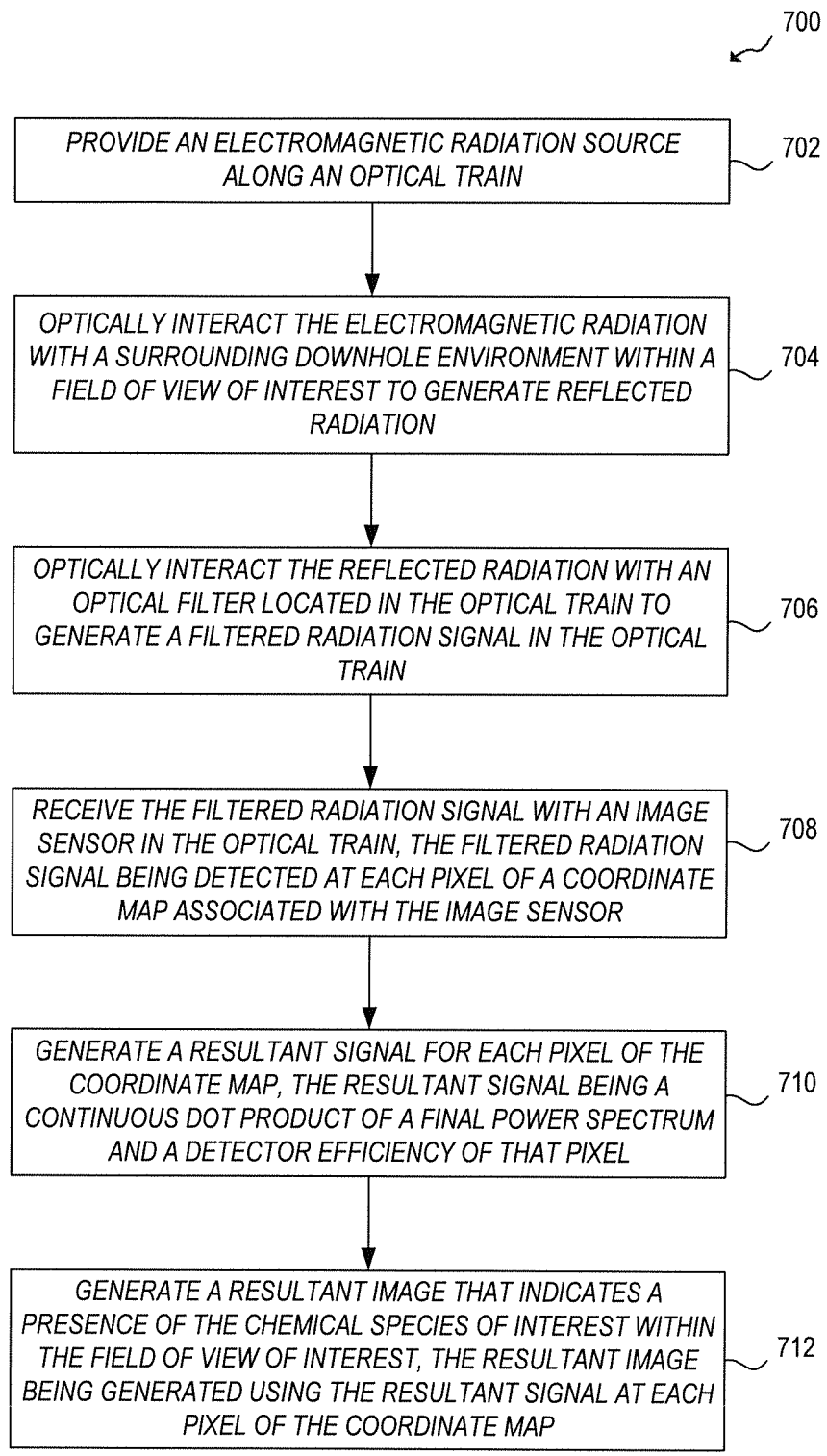
FIG. 7 illustrates a flow chart of an example process for conducting a real-time chemical analysis of deposits in accordance with one or more implementations.

FIG. 7 illustrates a flow chart of an example process 700 for conducting a real-time chemical analysis of deposits in accordance with one or more implementations. Steps in the process 700 may be performed at least partially by a computer including a processor circuit executing commands stored in a memory circuit. When the processor circuit executes the commands, it causes the computer to perform partially or completely at least some of the steps in the process 700. Moreover, embodiments consistent with the present disclosure may include at least one, but not all of the steps illustrated in FIG. 7. Further, in some implementations within the scope of the present disclosure a method may include at least some of the steps in FIG. 7 performed in a different sequence, or even partially or totally overlapping in time.

Step 702 includes providing an electromagnetic radiation source along an optical train, the electromagnetic radiation source emitting electromagnetic radiation having a power density spectrum.

Step 704 includes optically interacting the electromagnetic radiation with a surrounding downhole environment within a field of view of interest to generate reflected radiation having a reflection spectrum. In some aspects, the reflection spectrum is a multiplication of an intensity of the electromagnetic radiation at a particular wavelength of a spectral response and a reflection coefficient of the chemical species of interest at the particular wavelength.

Step 706 includes optically interacting the reflected radiation with an optical filter located in the optical train to generate filtered radiation signal in the optical train, in which the optical filter has a transmission function that corresponds to a chemical species of interest. In some aspects, the reflection spectrum is attenuated at each wavelength of a spectral response by the optical filter.

Step 708 includes receiving the filtered radiation signal with an image sensor in the optical train, in which the filtered radiation signal is detected at each pixel of a coordinate map associated with the image sensor. In some aspects, the process 700 includes receiving the filtered radiation signal in one of an ultraviolet spectral range, a visible spectral range, a near-infrared spectral range, or a mid-infrared spectral range.

Step 710 includes generating a resultant signal for each pixel of the coordinate map, the resultant signal being a continuous dot product of a final power spectrum and a detector efficiency of that pixel. In some aspects, the final power spectrum includes a dot product of the power density spectrum, the reflection spectrum, and the transmission function of the optical filter. In some aspects, the detector efficiency includes an efficiency value of the image sensor at a particular wavelength of a spectral response for each pixel of the coordinate map.

Step 712 includes generating a resultant image that indicates a presence of the chemical species of interest within the field of view of interest, in which the resultant image is generated using the resultant signal at each pixel of the coordinate map.

In optically interacting the reflected radiation with the optical filter, the process 700 may include optically interacting the reflected radiation with a first optical filter located in the optical train to generate a first filtered radiation signal in the optical train, and optically interacting the reflected radiation with a second optical filter located in the optical train to generate a second filtered radiation signal in the optical train. In some aspects, the first optical filter and the second optical filter have different transmission functions.

In optically interacting the reflected radiation with the optical filter, the process 700 may include comparing the reflection spectrum of the reflected radiation to the transmission function of the optical filter, and determining whether the reflection spectrum corresponds to the transmission function based on the comparing. The filtered radiation signal comprises a first set of intensity values at respective wavelengths of a spectral response when the reflection spectrum corresponds to the transmission function in some implementations, or the filtered radiation signal comprises a second set of intensity values at the respective wavelengths of the spectral response when the reflection spectrum does not correspond to the transmission function in other implementations. In this respect, the first set of intensity values may be greater than the second set of intensity values.

In receiving the filtered radiation signal with the image sensor, the process 700 may include receiving the first filtered radiation signal with the image sensor, and receiving the second filtered radiation signal with the image sensor. In some aspects, the first filtered radiation signal and the second filtered radiation signal are received by the image sensor simultaneously.

In generating the resultant signal, the process 700 may include generating a first resultant signal from the first filtered radiation signal, and generating a second resultant signal from the second filtered radiation signal, in which the resultant image is generated using the first resultant signal and the second resultant signal.

In some implementations, the process 700 includes adjusting the optical filter from a first position to a second position in the optical train, and receiving the filtered radiation signal with the image sensor based on the optical filter being at the second position. In some aspects, the resultant image identifies the presence of the chemical species of interest at a different location within the field of view of interest between the first position and the second position of the optical filter.

In one or more implementations, the process 700 includes replacing the optical filter with a different optical filter having a different transmission function from that of the optical filter, and detecting the presence of a different chemical species of interest within the field of view of interest with the image sensor based on the different optical filter.

In some aspects, the optical filter includes multiple optical filters, in which each of the optical filters has a different transmission function that corresponds to a respective chemical species of interest. In one or more implementations, the process 700 may include selecting one of the optical filters that optically interacts with the reflected radiation by repositioning the optical filter to a different position relative to a stationary position of the image sensor. In other implementations, the process 700 may include selecting one of the optical filters that optically interacts with the reflected radiation by repositioning the image sensor to a different position relative to a stationary position of the optical filter.

Figure 8A:
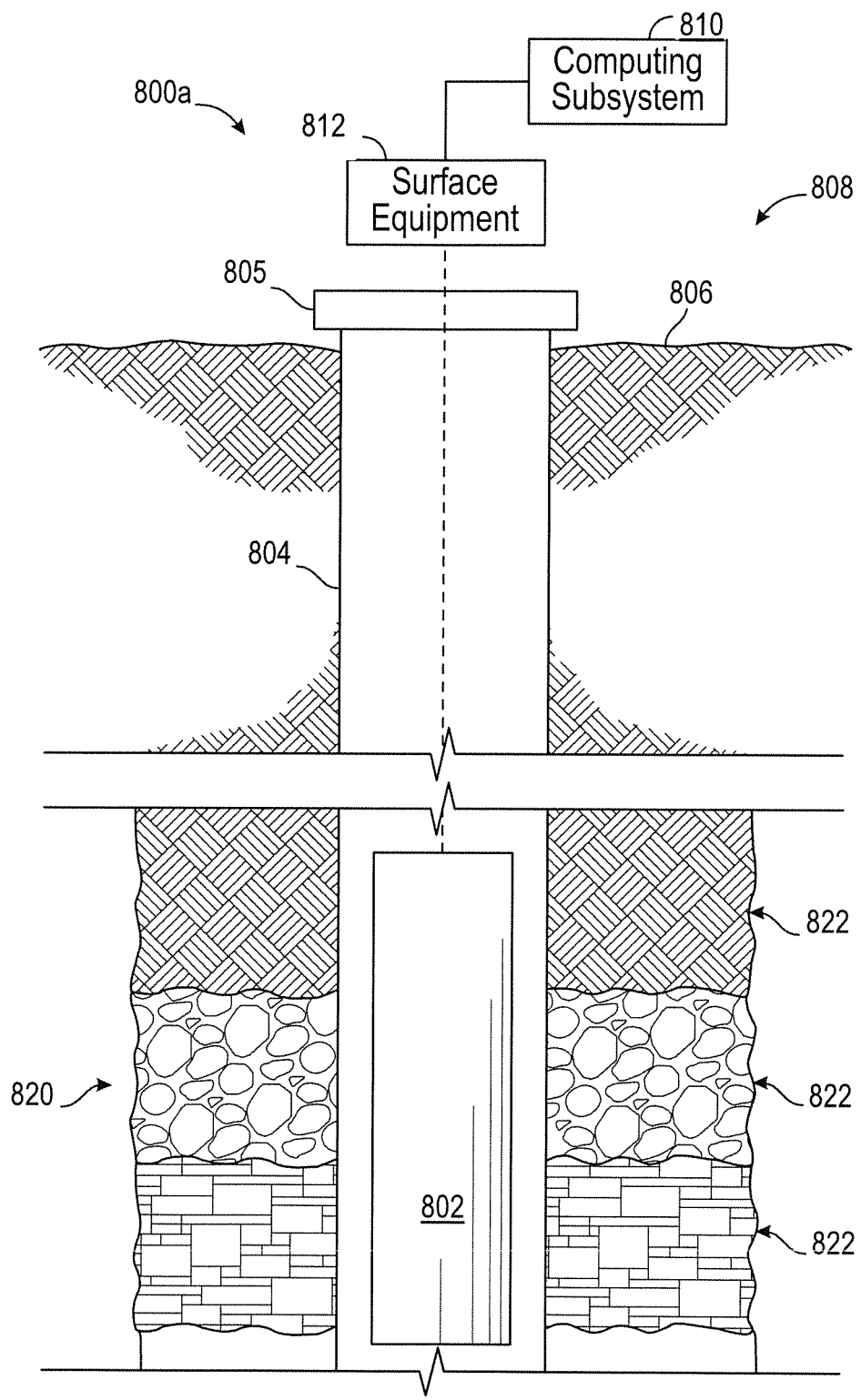
FIG. 8A illustrates a schematic view of a logging operation deployed in and around a well system in accordance with one or more implementations.

FIG. 8A depicts a schematic view of a logging operation deployed in and around a well system 800a in accordance with one or more implementations. The well system 800a includes a logging system 808 and a subterranean region 820 beneath the ground surface 806. The well system 800a can also include additional or different features that are not shown in FIG. 8A. For example, the well system 800a can include additional drilling system components, wireline logging system components, or other components.

The subterranean region 820 includes all or part of one or more subterranean formations or zones. The subterranean region 820 shown in FIG. 8A, for example, includes multiple subsurface layers 822. The subsurface layers 822 can include sedimentary layers, rock layers, sand layers, or any combination thereof and other types of subsurface layers. One or more of the subsurface layers can contain fluids, such as brine, oil, gas, or combinations thereof. A wellbore 804 penetrates through the subsurface layers 822. Although the wellbore 804 shown in FIG. 8A is a vertical wellbore, the logging system 808 can also be implemented in other wellbore orientations. For example, the logging system 808 may be adapted for horizontal wellbores, slant wellbores, curved wellbores, vertical wellbores, or any combination thereof.

The logging system 808 also includes a logging tool 802, surface equipment 812, and a computing subsystem 810. In the shown in FIG. 8A, the logging tool 802 is a downhole logging tool that operates while disposed in the wellbore 804. The surface equipment 812 shown in FIG. 8A operates at or above the surface 806, for example, near the well head 805, to control the logging tool 802 and possibly other downhole equipment or other components of the well system 800a. The computing subsystem 810 receives and analyzes logging data from the logging tool 802. A logging system can include additional or different features, and the features of an logging system can be arranged and operated as represented in FIG. 8A or in another manner.

All or part of the computing subsystem 810 can be implemented as a component of, or integrated with one or more components of, the surface equipment 812, the logging tool 802, or both. For example, the computing subsystem 810 can be implemented as one or more computing structures separate from but communicative with the surface equipment 812 and the logging tool 802.

The computing subsystem 810 can be embedded in the logging tool 802 (not shown), and the computing subsystem 810 and the logging tool 802 operate concurrently while disposed in the wellbore 804. For example, although the computing subsystem 810 is shown above the surface 806 in FIG. 8A, all or part of the computing subsystem 810 may reside below the surface 806, for example, at or near the location of the logging tool 802.

The well system 800a includes communication or telemetry equipment that allows communication among the computing subsystem 810, the logging tool 802, and other components of the logging system 808. For example, each of the components of the logging system 808 can include one or more transceivers or similar apparatus for wired or wireless data communication among the various components. The logging system 808 can include, but is not limited to, one or more systems and/or apparatus for wireline telemetry, Wired pipe telemetry, mud pulse telemetry, acoustic telemetry, electromagnetic telemetry, or any combination of these and other types of telemetry. In some embodiments, the logging tool 802 receives commands, status signals, or other types of information from the computing subsystem 810 or another source. The computing subsystem 810 can also receive logging data, status signals, or other types of information from the logging tool 802 or another source.

Logging operations are performed in connection with various types of downhole operations at various stages in the lifetime of a well system and therefore structural attributes and components of the surface equipment 812 and logging tool 802 are adapted for various types of logging operations. For example, logging may be performed during drilling operations, during wireline logging operations, or in other contexts. As such, the surface equipment 812 and the logging tool 802 can include or operate in connection with drilling equipment, wireline logging equipment, or other equipment for other types of operations.

Figure 8B:
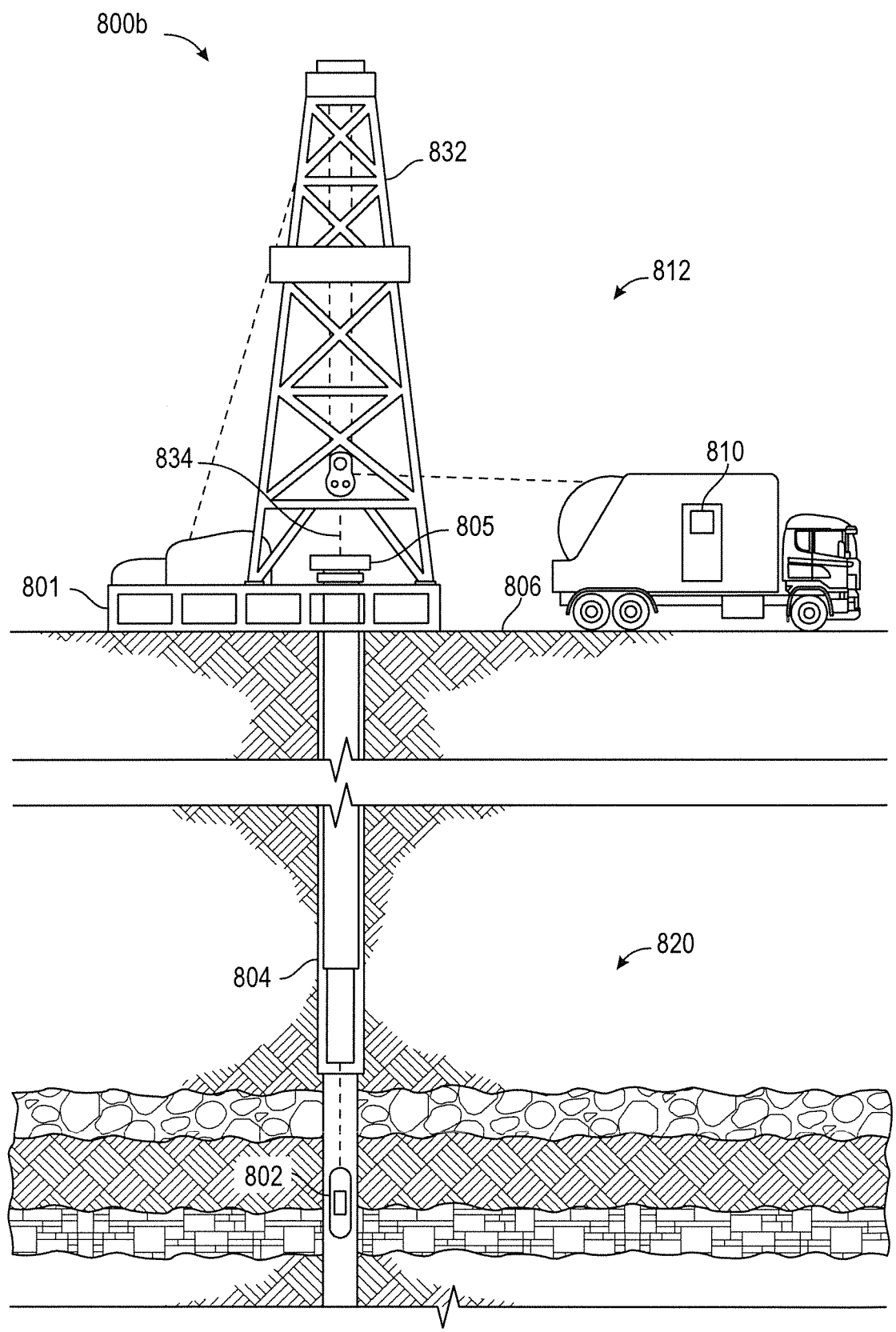
FIG. 8B illustrates a schematic view of a wireline logging operation deployed in and around a well system in accordance with one or more implementations.

FIG. 8B depicts a schematic view of a wireline logging operation deployed in and around a well system 800b in accordance with one or more implementations. The well system 800b includes the logging tool 802 in a wireline logging environment. The surface equipment 812 includes, but is not limited to, a platform 801 disposed above the surface 806 equipped with a derrick 832 that supports a wireline cable 834 extending into the wellbore 804. Wireline logging operations are performed, for example, after a drill string is removed from the wellbore 804, to allow the wireline logging tool 802 to be lowered by wireline or logging cable into the wellbore 804.

Figure 8C:
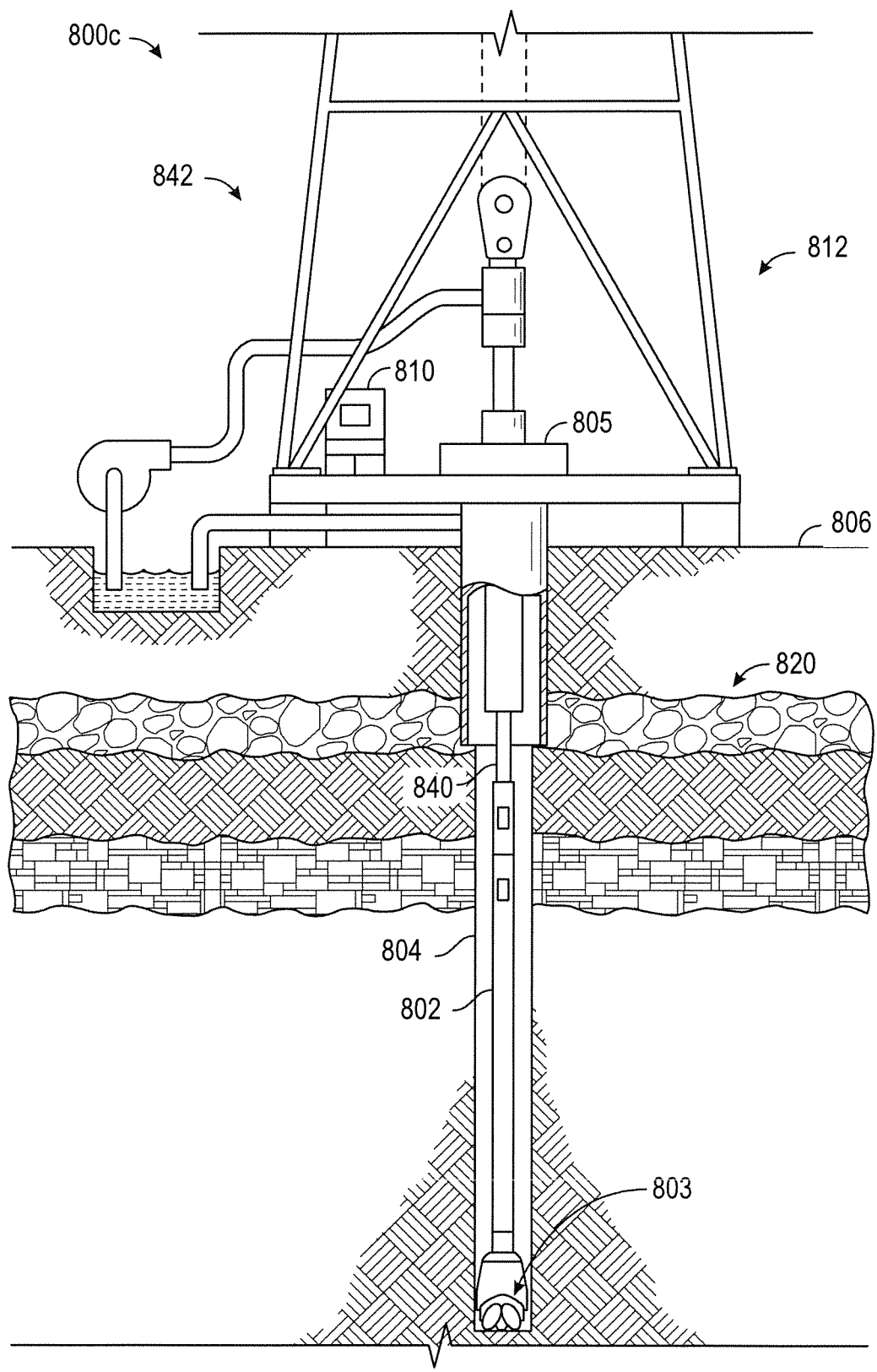
FIG. 8C illustrates a schematic view of a well system that includes the logging tool in a logging while drilling (LWD) environment in accordance with one or more implementations.

FIG. 8C depicts a schematic view of a well system 800c that includes the logging tool 802 in a logging while drilling (LWD) environment in accordance with one or more implementations. logging operations is performed during drilling operations. Drilling is performed using a string of drill pipes connected together to form a drill string 840 that is lowered through a rotary table into the wellbore 804. A drilling rig 842 at the surface 806 supports the drill string 840, as the drill string 840 is operated to drill a wellbore penetrating the subterranean region 820. The drill string 840 can include, for example, but is not limited to, a kelly, a drill pipe, a bottom hole assembly, and other components. The bottom hole assembly on the drill string can include drill collars, drill bits, the logging tool 802, and other components. Exemplary logging tools can be or include, but are not limited to, measuring while drilling (MWD) tools and LWD tools.

The logging tool 802 includes a tool for obtaining measurements from the subterranean region 820. As shown, for example, in FIG. 8B, the logging tool 802 is suspended in the wellbore 804 by a coiled tubing, wireline cable, or another structure or conveyance that connects the tool to a surface control unit or other components of the surface equipment 812.

The logging tool 802 is lowered to the bottom of a region of interest and subsequently pulled upward (e.g., at a substantially constant speed) through the region of interest. As shown, for example, in FIG. 8C, the logging tool 802 is deployed in the wellbore 804 on jointed drill pipe, hard wired drill pipe, or other deployment hardware. In other example implementations, the logging tool 802 collects data during drilling operations as it moves downward through the region of interest. The logging tool 802 may also collect data while the drill string 840 is moving, for example, while the logging tool 802 is being tripped in or tripped out of the wellbore 804.

The logging tool 802 may also collect data at discrete logging points in the wellbore 804. For example, the logging tool 802 moves upward or downward incrementally to each logging point at a series of depths in the wellbore 804. At each logging point, instruments in the logging tool 802 perform measurements on the subterranean region 820. The logging tool 802 also obtains measurements while the logging tool 802 is moving (e.g., being raised or lowered). The measurement data is communicated to the computing subsystem 810 for storage, processing, and analysis. Such data may be gathered and analyzed during drilling operations (e.g., LWD operations), during wireline logging operations, other conveyance operations, or during other types of activities.

The computing subsystem 810 receives and analyzes the measurement data from the logging tool 802 to detect properties of various subsurface layers 822. For example, the computing subsystem 810 can identify the density, material content, and/or other properties of the subsurface layers 822 based on the measurements acquired by the logging tool 802 in the wellbore 804.

Figure 9:
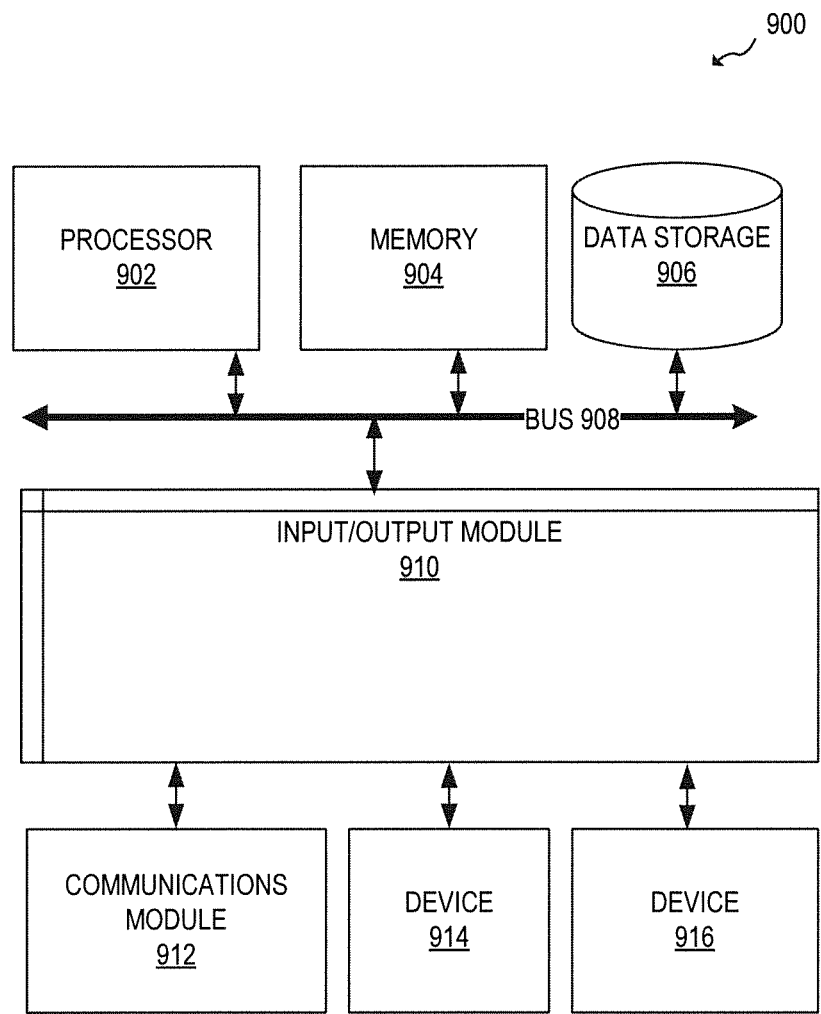
FIG. 9 is a block diagram illustrating an example computer system with which the computing subsystem of FIG. 6A can be implemented.

FIG. 9 is a block diagram illustrating an exemplary computer system 900 with which the computing subsystem 810 of FIG. 8A can be implemented. In certain aspects, the computer system 900 may be implemented using hardware or a combination of software and hardware, either in a dedicated server, integrated into another entity, or distributed across multiple entities.

Computer system 900 (e.g., computing subsystem 810) includes a bus 908 or other communication mechanism for communicating information, and a processor 902 coupled with bus 908 for processing information. By way of example, the computer system 900 may be implemented with one or more processors 902. Processor 902 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

Computer system 900 can include, in addition to hardware, code that creates an execution environment for the computer program in question, e.g., code that constitutes processor firmware, a protocol stack, a database management system, an operating system, or a combination of one or more of them stored in an included memory 904, such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device, coupled to bus 908 for storing information and instructions to be executed by processor 902. The processor 902 and the memory 904 can be supplemented by, or incorporated in, special purpose logic circuitry.

The instructions may be stored in the memory 904 and implemented in one or more computer program products, i.e., one or more modules of computer program instructions encoded on a computer readable medium for execution by, or to control the operation of, the computer system 900, and according to any method well known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, and xml-based languages. Memory 904 may also be used for storing temporary variable or other intermediate information during execution of instructions to be executed by processor 902.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 900 further includes a data storage device 906 such as a magnetic disk or optical disk, coupled to bus 908 for storing information and instructions. Computer system 900 may be coupled via input/output module 910 to various devices. The input/output module 910 can be any input/output module. Exemplary input/output modules 910 include data ports such as USB ports. The input/output module 910 is configured to connect to a communications module 912. Exemplary communications modules 912 include networking interface cards, such as Ethernet cards and modems. In certain aspects, the input/output module 910 is configured to connect to a plurality of devices, such as an input device 914 and/or an output device 916. Exemplary input devices 914 include a keyboard and a pointing device, e.g., a mouse or a trackball, by which a user can provide input to the computer system 900. Other kinds of input devices 914 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback, and input from the user can be received in any form, including acoustic, speech, tactile, or brain wave input. Exemplary output devices 916 include display devices such as a LCD (liquid crystal display) monitor, for displaying information to the user, or diagnostic devices such as an oscilloscope.

According to one aspect of the present disclosure, the computing subsystem 110 can be implemented using a computer system 900 in response to processor 902 executing one or more sequences of one or more instructions contained in memory 904. Such instructions may be read into memory 904 from another machine-readable medium, such as data storage device 906. Execution of the sequences of instructions contained in the main memory 904 causes processor 902 to perform the process steps described herein. One or more processors in a multi-processing arrangement may also be employed to execute the sequences of instructions contained in the memory 904. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., such as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. The communication network can include, for example, any one or more of a LAN, a WAN, the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

Computer system 900 can include clients and servers. A client and server are generally remote from each other and typically interact through a communication network. The relationship of client and server arises by virtue of computer programs running on the respective computers and having a client-server relationship to each other. Computer system 900 can be, for example, and without limitation, a desktop computer, laptop computer, or tablet computer. Computer system 900 can also be embedded in another device, for example, and without limitation, a mobile telephone such as a smartphone.

The term "machine-readable storage medium" or "computer readable medium" as used herein refers to any medium or media that participates in providing instructions to processor 902 for execution. Such a medium may take many forms, including, but not limited to, non-volatile media, volatile media, and transmission media. Non-volatile media include, for example, optical or magnetic disks, such as data storage device 906. Volatile media include dynamic memory, such as memory 904. Transmission media include coaxial cables, copper wire, and fiber optics, including the wires that comprise bus 908. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

Various examples of aspects of the disclosure are described below. These are provided as examples, and do not limit the subject technology.

In an embodiment of the present disclosure, a method includes providing an electromagnetic radiation source along an optical train, the electromagnetic radiation source emitting electromagnetic radiation having a power density spectrum. The method includes optically interacting the electromagnetic radiation with a surrounding downhole environment within a field of view of interest to generate reflected radiation having a reflection spectrum. The method also includes optically interacting the reflected radiation with an optical filter located in the optical train to generate filtered radiation signal in the optical train, the optical filter having a transmission function that corresponds to a chemical species of interest. The method also includes receiving the filtered radiation signal with an image sensor in the optical train, the filtered radiation signal being detected at a pixel of a coordinate map associated with the image sensor. The method also includes generating a resultant signal for the pixel of the coordinate map, the resultant signal being a function of a final power spectrum and a detector efficiency of that pixel. The method also includes generating a resultant image that indicates a presence of the chemical species of interest within the field of view of interest, the resultant image being generated using the resultant signal at a plurality of pixels of the coordinate map.

In an embodiment of the present disclosure, a system includes a downhole tool and an electromagnetic radiation source positioned on the downhole tool and configured to emit electromagnetic radiation to a surrounding downhole environment within a field of view of interest. The system also includes a multivariate optical element positioned on the downhole tool and comprising one or more optical filters configured to receive reflected radiation from the field of view of interest and generate respective filtered radiation signals, each of the one or more optical filters comprising a different transmission function that corresponds to a respective chemical species of interest. The system also includes an image sensor positioned on the downhole tool and configured to detect each of the respective filtered radiation signals from the multivariate optical element, the image sensor providing image information of the field of view of interest that indicates a presence of at least one chemical species of interest located in the surrounding downhole environment.

In one or more aspects, examples of clauses are described below.

A method comprising one or more methods, operations or portions thereof described herein.

An apparatus comprising one or more memories and one or more processors (e.g., 900), the one or more processors configured to cause performing one or more methods, operations or portions thereof described herein.

An apparatus comprising one or more memories (e.g., 904, one or more internal, external or remote memories, or one or more registers) and one or more processors (e.g., 902) coupled to the one or more memories, the one or more processors configured to cause the apparatus to perform one or more methods, operations or portions thereof described herein.

An apparatus comprising means (e.g., 900) adapted for performing one or more methods, operations or portions thereof described herein.

A processor (e.g., 902) comprising modules for carrying out one or more methods, operations or portions thereof described herein.

A hardware apparatus comprising circuits (e.g., 900) configured to perform one or more methods, operations or portions thereof described herein.

An apparatus comprising means (e.g., 900) adapted for performing one or more methods, operations or portions thereof described herein.

An apparatus comprising components (e.g., 900) operable to carry out one or more methods, operations or portions thereof described herein.

A computer-readable storage medium (e.g., 904, one or more internal, external or remote memories, or one or more registers) comprising instructions stored therein, the instructions comprising code for performing one or more methods or operations described herein.

A computer-readable storage medium (e.g., 904, one or more internal, external or remote memories, or one or more registers) storing instructions that, when executed by one or more processors, cause one or more processors to perform one or more methods, operations or portions thereof described herein.

In one aspect, a method may be an operation, an instruction, or a function and vice versa. In one aspect, a clause or a claim may be amended to include some or all of the words (e.g., instructions, operations, functions, or components) recited in other one or more clauses, one or more words, one or more sentences, one or more phrases, one or more paragraphs, and/or one or more claims.

To illustrate the interchangeability of hardware and software, items such as the various illustrative blocks, modules, components, methods, operations, instructions, and algorithms have been described generally in terms of their functionality. Whether such functionality is implemented as hardware, software or a combination of hardware and software depends upon the particular application and design constraints imposed on the overall system. Skilled artisans may implement the described functionality in varying ways for each particular application.

A reference to an element in the singular is not intended to mean one and only one unless specifically so stated, but rather one or more. For example, "a" module may refer to one or more modules. An element proceeded by "a," "an," "the," or "said" does not, without further constraints, preclude the existence of additional same elements.

Headings and subheadings, if any, are used for convenience only and do not limit the subject technology. The word exemplary is used to mean serving as an example or illustration. To the extent that the term include, have, or the like is used, such term is intended to be inclusive in a manner similar to the term comprise as comprise is interpreted when employed as a transitional word in a claim. Relational terms such as first and second and the like may be used to distinguish one entity or action from another without necessarily requiring or implying any actual such relationship or order between such entities or actions.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A phrase "at least one of" preceding a series of items, with the terms "and" or "or" to separate any of the items, modifies the list as a whole, rather than each member of the list. The phrase "at least one of" does not require selection of at least one item; rather, the phrase allows a meaning that includes at least one of any one of the items, and/or at least one of any combination of the items, and/or at least one of each of the items. By way of example, each of the phrases "at least one of A, B, and C" or "at least one of A, B, or C" refers to only A, only B, or only C; any combination of A, B, and C; and/or at least one of each of A, B, and C.

It is understood that the specific order or hierarchy of steps, operations, or processes disclosed is an illustration of exemplary approaches. Unless explicitly stated otherwise, it is understood that the specific order or hierarchy of steps, operations, or processes may be performed in different order. Some of the steps, operations, or processes may be performed simultaneously. The accompanying method claims, if any, present elements of the various steps, operations or processes in a sample order, and are not meant to be limited to the specific order or hierarchy presented. These may be performed in serial, linearly, in parallel or in different order. It should be understood that the described instructions, operations, and systems can generally be integrated together in a single software/hardware product or packaged into multiple software/hardware products.

The disclosure is provided to enable any person skilled in the art to practice the various aspects described herein. In some instances, well-known structures and components are shown in block diagram form in order to avoid obscuring the concepts of the subject technology. The disclosure provides various examples of the subject technology, and the subject technology is not limited to these examples. Various modifications to these aspects will be readily apparent to those skilled in the art, and the principles described herein may be applied to other aspects.

All structural and functional equivalents to the elements of the various aspects described throughout the disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for".

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately claimed subject matter.

The claims are not intended to be limited to the aspects described herein, but are to be accorded the full scope consistent with the language claims and to encompass all legal equivalents. Notwithstanding, none of the claims are intended to embrace subject matter that fails to satisfy the requirements of the applicable patent law, nor should they be interpreted in such a way.

Therefore, the subject technology is well adapted to attain the ends and advantages mentioned as well as those that are inherent therein. The particular embodiments disclosed above are illustrative only, as the subject technology may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the subject technology. The subject technology illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

What is claimed is:

1. A method, comprising:
providing an electromagnetic radiation source along an optical train, the electromagnetic radiation source emitting electromagnetic radiation having a power density spectrum;
optically interacting the electromagnetic radiation with a surrounding downhole environment within a field of view of interest to generate reflected radiation having a reflection spectrum;
optically interacting the reflected radiation with an optical filter located in the optical train to generate filtered radiation signal in the optical train, the optical filter having a transmission function that corresponds to a chemical species of interest;
receiving the filtered radiation signal with an image sensor in the optical train, the filtered radiation signal being detected at a pixel of a coordinate map associated with the image sensor;
generating a resultant signal for the pixel of the coordinate map, the resultant signal being a function of a final power spectrum and a detector efficiency of that pixel; and
generating a resultant image that indicates a presence of the chemical species of interest within the field of view of interest, the resultant image being generated using the resultant signal at a plurality of pixels of the coordinate map.

2. The method of claim 1, wherein the reflection spectrum is attenuated at each wavelength of a spectral response by the optical filter.

3. The method of claim 1, wherein the reflection spectrum is a multiplication of an intensity of the electromagnetic radiation at a particular wavelength of a spectral response and a reflection coefficient of the chemical species of interest at the particular wavelength.

4. The method of claim 1, wherein the final power spectrum is a function of the power density spectrum, the reflection spectrum, and the transmission function of the optical filter.

5. The method of claim 1, wherein the detector efficiency comprises an efficiency value of the image sensor at a particular wavelength of a spectral response for each pixel of the coordinate map.

6. The method of claim 1, wherein optically interacting the reflected radiation with the optical filter comprises:
optically interacting the reflected radiation with a first optical filter located in the optical train to generate a first filtered radiation signal in the optical train; and
optically interacting the reflected radiation with a second optical filter located in the optical train to generate a second filtered radiation signal in the optical train, wherein the first optical filter and the second optical filter have different transmission functions.

7. The method of claim 6, wherein receiving the filtered radiation signal with the image sensor comprises:
receiving the first filtered radiation signal with the image sensor; and
receiving the second filtered radiation signal with the image sensor, wherein the first filtered radiation signal and the second filtered radiation signal are received by the image sensor simultaneously.

8. The method of claim 7, wherein generating the resultant signal comprises:
generating a first resultant signal from the first filtered radiation signal; and
generating a second resultant signal from the second filtered radiation signal, wherein the resultant image is generated using the first resultant signal and the second resultant signal.

9. The method of claim 1, wherein optically interacting the reflected radiation comprises:
comparing the reflection spectrum of the reflected radiation to the transmission function of the optical filter; and
determining whether the reflection spectrum corresponds to the transmission function based on the comparing, wherein the filtered radiation signal comprises a first set of intensity values at respective wavelengths of a spectral response when the reflection spectrum corresponds to the transmission function, wherein the filtered radiation signal comprises a second set of intensity values at the respective wavelengths of the spectral response when the reflection spectrum does not correspond to the transmission function, and wherein the first set of intensity values are greater than the second set of intensity values.

10. The method of claim 1, further comprising:
adjusting the optical filter from a first position to a second position in the optical train; and
receiving the filtered radiation signal with the image sensor based on the optical filter being at the second position, wherein the resultant image identifies the presence of the chemical species of interest at a different location within the field of view of interest between the first position and the second position of the optical filter.

11. The method of claim 1, further comprising:
replacing the optical filter with a different optical filter having a different transmission function from that of the optical filter; and
detecting the presence of a different chemical species of interest within the field of view of interest with the image sensor based on the different optical filter.

12. The method of claim 1, wherein the optical filter comprises a plurality of optical filters, each of the plurality of optical filters having a different transmission function that corresponds to a respective chemical species of interest.

13. The method of claim 12, further comprising:
selecting one of the plurality of optical filters that optically interacts with the reflected radiation by repositioning the optical filter to a different position relative to a stationary position of the image sensor.

14. The method of claim 12, further comprising:
selecting one of the plurality of optical filters that optically interacts with the reflected radiation by repositioning the image sensor to a different position relative to a stationary position of the optical filter.

15. The method of claim 1, wherein receiving the filtered radiation comprises:
receiving the filtered radiation signal in one of an ultraviolet spectral range, a visible spectral range, a near-infrared spectral range, or a mid-infrared spectral range.

16. A system, comprising: a downhole tool;
an electromagnetic radiation source positioned on the downhole tool and configured to emit electromagnetic radiation to a surrounding downhole environment within a field of view of interest;
a multivariate optical element positioned on the downhole tool and comprising one or more optical filters configured to receive reflected radiation from the field of view of interest and generate respective filtered radiation signals, each of the one or more optical filters comprising a different transmission function that corresponds to a respective chemical species of interest; and
an image sensor positioned on the downhole tool and configured to detect each of the respective filtered radiation signals from the multivariate optical element, the filtered radiation signal being detected at a pixel of a coordinate map associated with the image sensor, wherein the image sensor generates a resultant signal for the pixel of the coordinate map, the resultant signal being a function of a final power spectrum and a detector efficiency of that pixel, and generate a resultant image that indicates a presence of a chemical species of interest within the field of view or interest, the resultant image being generated using the resultant signal at a plurality of pixels of the coordinate map.

17. The system of claim 16, wherein the electromagnetic radiation source, the multivariate optical element, and the image sensor are positioned on a distal end of the downhole tool, and wherein the electromagnetic radiation source, the multivariate optical element, and the image sensor are pointing in a direction that is orthogonal to an axial length of the downhole tool.

18. The system of claim 16, further comprising:
a plurality of image sensors positioned on the downhole tool, wherein the plurality of image sensors are positioned pointing radially along an axial length of the downhole tool.

19. The system of claim 18, wherein each of the plurality of image sensors is arranged with a different optical filter, and wherein the image information from each of the plurality of image sensors indicates the presence of a different chemical species of interest located in the surrounding downhole environment.

20. The system of claim 16, further comprising a controller having a memory and a processor, wherein the memory comprises commands which, when executed by the processor, cause the system to render a representation of the chemical species of interest within the field of view of interest in the surrounding downhole environment.

\* \* \* \* \*